2,908,612

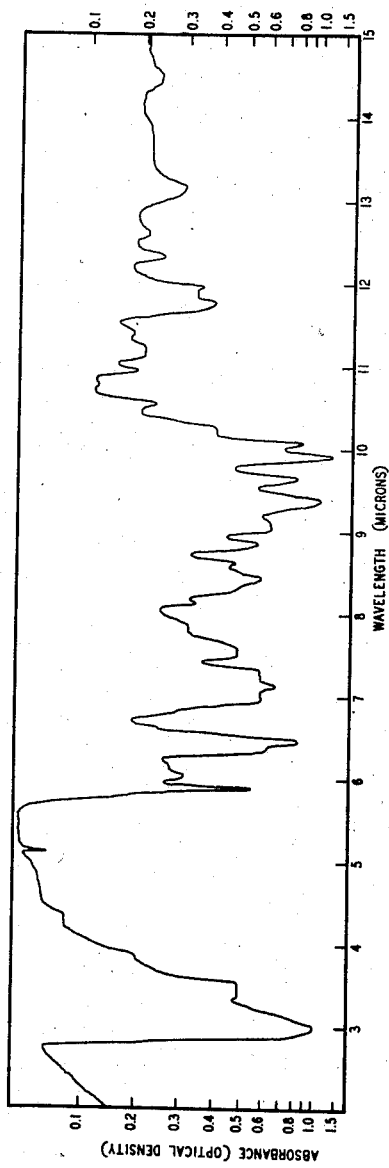

AMPHOTERICIN A AND ITS SALTS

James D. Dutcher, New Brunswick, William Gold, Highland Park, Joseph F. Pagano, Bound Brook, and John Vandeputte, Milltown, N.J., assignors to Olin Mathieson Chemical Corporation, New York, N.Y., a corporation of Virginia Application March 25, 1957, Serial No. 648,090

6 Claims. (Cl. 167—65)

This application is a continuation-in-part of our parent application Serial No. 478,014, filed December 28, 1954.

This invention relates to a new and useful antibiotic and its salts.

More particularly, it relates to the new antibiotic called amphotericin A, in various forms.

Amphotericin A is formed by the cultivation, under controlled conditions, of a hitherto undiscovered species of Streptomyces.

THE MICROORGANISM

The microorganism useful for the preparation of amphotericin A is a newly discovered species of Streptomyces isolated from a sample obtained at Tembladora on the Orinoco River in South America. A culture of the living organism has been deposited in, and made a part of the stock culture collection of, the Rutgers Institute of Microbiology (New Brunswick, New Jersey), from whence it is available; and it has been assigned the number 3694 in the Waksman Collection and is hereinafter designated as *Streptomyces nodosus.*

It is to be understood that the process of this invention is not limited to the use of the particular organism described herein but includes, inter alia, mutants produced from the described organism by mutating agents, such as X-rays, ultraviolet radiation and nitrogen mustards.

The isolation and characterization of this microorganism is described in said parent application, Serial No. 478,014.

THE ANTIBIOTIC

*Streptomyces nodosus* produces a mixture of antibiotics. The mixture itself, as well as the specific antibiotics isolated from said mixture, possesses a wide antifungal spectrum but no significant antibacterial properties.

In order to form amphotericin A, *Streptomyces nodosus* is grown at a suitable temperature of from 23° C. to 30° C., preferably about 25° C., under submerged aerobic conditions in an aqueous nutrient medium containing an assimilable, fermentable carbohydrate source and an assimilable nitrogen source. Suitable carbohydrate sources include: starch; dextrin; sugars, such as maltose, lactose and glucose; glycerol; etc. Suitable nitrogen sources include asparagine, casein hydrolysate, soybean meal, beef extract, yeast extract, etc. The fermentation is carried out for about 24 to 150 hours. At the end of this period of time, a substantial amount of amphotericin A has been formed (as shown by bioassays), as more fully disclosed in the examples.

After growth has been completed, a mixture of amphotericin A and amphotericin B (hereinafter called simply amphotericin) is separated from the culture by any one of the three following alternative methods:
(1) The mycelium is separated from the whole broth by filtration or centrifugation, and amphotericin is extracted from the mycelium after lowering the pH of the mycelium to about 2 to 3 by treatment with an acid. The extraction is done with a suitable solvent such as a lower alkanol (e.g., isopropanol, n-propanol or n-butanol). Evaporation of the alkanol causes precipitation of the crude amphotericin. (2) The whole broth is alkalinized to a pH about 11, and preferably to a pH of about 12, by means of a base such as sodium hydroxide or potassium hydroxide. The broth is then agitated and filtered, and the filtrate is neutralized to a pH of about 7 by means of an acid, such as a mineral acid (e.g., hydrochloric acid, sulfuric acid or phosphoric acid) to precipitate the crude amphotericin. (3) The pH of the whole broth is adjusted either to a value of about 2 to 3 (by treatment with an acid) or a value of 10 to 11 (by treatment with a base), since amphotericin is more soluble at these pH ranges. The broth is then extracted with a suitable extracting agent, such as the alkanols previously listed, and filtered; the phases are separated (if n-butanol is used). The crude amphotericin is then directly precipitated from the filtrate by neutralizing to a pH of about 7 and removing a portion of the extracting agent by vacuum distillation.

Further purification of the crude amphotericin isolated by any one of these processes results in fractionation into its two components, amphotericin A and amphotericin B. This fractionation is carried out by either one of the following processes:

(1) The precipitate of crude amphotericin is slurried in an alcohol, such as a lower alkanol (e.g., methanol, n-propanol, isopropanol and butanol), at a low pH (obtained by treating the slurry with an acid such as a mineral acid) and filtered. The insoluble material consists mainly of crude amphotericin B. The filtrate is neutralized with a base, such as sodium hydroxide, to cause formation of a precipitate of purified crystalline material, representing primarily amphotericin A.

(2) The precipitate of crude amphotericin is slurried in a solvent, such as a di(lower alkyl) lower alkanoic acid amide (e.g., dimethyl formamide, dimethyl acetamide or diethyl formamide) and filtered. The insoluble material consists mainly of crude amphotericin B. By treating the amide solution with a mixture of water and an organic polar solvent, such as aqueous alcohol (e.g., a methanol-water solution) or an aqueous ketone (e.g., an acetone-water solution), a crystalline precipitate comprising mainly amphotericin A is obtained.

Amphotericin A is an amphoteric substance which easily forms salts with both bases and acids. Thus by treating amphotericin A with an inorganic base, such as an alkali metal base (e.g., sodium hydroxide or potassium hydroxide) or an alkaline earth metal base, the corresponding metal salt is formed. By treating amphotericin A with an alkaline earth metal salt (e.g., calcium chloride or magnesium chloride) in an alcohol such as methanol, complexes are formed. By reacting amphotericin A with ammonium hydroxide or an organic nitrogen base, the corresponding ammonium or amine salt is formed.

Amphotericin A further reacts with both mineral and organic acids to form the corresponding acid salt. Thus amphotericin A can be reacted with mineral acids, such as hydrochloric acid, sulfuric acid or phosphoric acid, to form the corresponding hydrochloride, sulfate or phosphate salt; or it may be reacted with organic acids such as acetic, citric or tartaric acid, to form the corresponding acid salts.

The following examples illustrate suitable methods for preparing, purifying and fractionating amphotericin A.

*Example 1*

TANK FERMENTATION OF *STREPTOMYCES NODOSUS*

An 800-gallon batch of *Streptomyces nodosus* is fermented with the inoculum medium, time and conditions tabulated below.

Inoculum preparation:
  A. First stage—
    Inoculum source: Culture *Streptomyces nodosus*, grown on Gould agar slants.
    Medium:
      3% Staley's Nutrient 4S
      2% glucose
      .0005% $CoCl_2.6H_2O$
      .1% $CaCo_3$
      pH adjusted to 7.0–7.2
    Sterilization: 30 minutes at 121° C.
    Volume: 100 ml. in 500-ml. flask
    Temperature: 25° C.
    Incubation: 72 hours on a reciprocating shaker (170 cycles per minute)
  B. Second stage—
    Inoculum source: 10% from first stage
    Medium: same as first stage
    Sterilization: 40 minutes at 121° C.
    Volume: 480 ml. in 2000 ml. flask
    Temperature: 25° C.
    Incubation: 48 hours on a reciprocating shaker (120 cycles per minute)
Fermentation conditions:
  Medium:
    3% Staley's Nutrient 4S
    2% glucose
    .25% $CaCo_3$
    .1% NaCl
    .0005% $CoCl_2$
  Sterilization: 15 minutes at 121° C. full dilution
  Temperature: 25° C.
  Agitation: .2 H.P./100 gal.
  Aeration: 2.0 ft./min. superficial air velocity
  Fermentation cycle: 144 hours
  Defoamer: Prime burning oil (about 0.5% of batch)
  Inoculum size: 480 ml. from second flask stage (4%)
  Volume: 12,000 ml.

The results of the fermentation are given in the following table (with respect to two batches):

| Batch | 1 | | | 2 | | |
|---|---|---|---|---|---|---|
| Fermentation Age, hours | Assay vs. *S. Cerevisae* dilution units | | pH | Assay vs. *S. Cerevisae* dilution units | | pH |
| | Extracted [1] | Broth [1] | | Extracted | Broth | |
| 0 | | | 6.5 | | | 6.6 |
| 25 | 1,600 | 120 | 7.2 | 640 | 120 | 7.2 |
| 49 | 1,600 | 120 | 7.0 | 120 | 120 | 7.1 |
| 73 | 8,000 | 180 | 7.1 | 12,000 | 80 | 7.3 |
| 97 | 4,000 | 80 | 7.0 | 3,000 | 120 | 7.1 |
| 121 | 3,000 | 40 | 6.9 | 4,000 | 120 | 7.9 |
| 144 | 9,706 | 2,560 | 7.2 | 40 | 80 | 8.1 |

[1] Samples were centifuged (the assays on the supernatant being reported as Broth) and the centrifugate extracted with a volume of butanol equal to the original sample (the assays on this extract being reported as Extracted).

*Example 2*

SHAKE FLASK FERMENTATION OF *STREPTOMYCES NODOSUS*

An appropriate inoculum, prepared in the manner described in Example 1, is introduced into a fermentation medium containing:

| | |
|---|---|
| Soybean meal | 10 gm. |
| Ground whole potato | 10 gm. |
| Dextrose | 10 gm. |
| $CoCl_2.6H_2O$ | 10 ml. of 0.05% solution. |
| $CaCO_3$ | 1 gm. |
| Distilled water | 1 liter. |

The medium is sterilized by autoclaving at 121° C. for 20 minutes prior to the introduction of the inoculum. At the end of four days, assays were run against *Saccharomyces cerevisiae* with a portion of the broth which has been lyophilized and reconstituted with water to about 2⅓ times the original concentration (on both the clear supernatant broth and on the butyl alcohol extract of the washed cells, restored to the original sample volume) giving the following results:

|   | *S. cerevisia* assay, dilution units/ml. |
|---|---|
| Broth supernatant-fluid | 5000 |
| Cell extracts | 5000 |

As a result of these assays, the fermentation is carried out for five days, at the end of which time a test of the broth for activity shows it to be active against *Candida albicans* in a disc test.

Amphotericin may be extracted from the whole broth in the manner illustrated by the following examples:

*Example 3*

ISOPROPANOL EXTRACTION FROM WHOLE BROTH

Extraction of amphotericin produced in Example 1 from the whole broth is carried out by adding 80 to 170% of the broth volume of isopropanol and adjusting to a pH of 2.0 with sulfuric acid. After agitation for about ½ hour, the mixture is filtered, preferably with the use of a filter-aid. The pH of the filtrate is readjusted to about 7 with sodium hydroxide and the isopropanol distilled off under vacuum at a temperature not greater than 35° C. The mixture is then placed in a cold room overnight, the precipitate which forms is filtered off, washed with acetone and dried in vacuum. A mixture of amphotericin A and amphotericin B is obtained in a yield of about 40%. The mixture assays about 1500–2500 d.u./mg. (*Saccharomyces cerevisiae*).

*Example 4*

BUTANOL EXTRACTION FROM WHOLE BROTH

To 9.4 liters of whole broth, assaying 3,000 d.u./ml., is added one-fourth of its volume of butanol. The pH is lowered to 2.0 with sulfuric acid, and the mixture is agitated well from one-half hour. Hyflo (5% w./v.) or other filter aid, is then added and the mixture filtered. The filtrate is placed in a separatory funnel and the butanol layer separated and retained. The butanol solution is then distilled down to ⅓ its original volume under vacuum at a temperature no greater than 35° C. A precipitate forms which is filtered off, washed well with acetone and vacuum dried. The product, which is obtained in about 22% yield, is a mixture of amphotericin A and amphotericin B and assays about 1600 d.u./mg. against *Saccharomyces cerevisiae* and about 960 d.u./mg. against *Candida albicans*.

*Example 5*

EXTRACTION OF AMPHOTERICIN FROM MYCELIUM

One liter of amphotericin-containing whole broth is centrifuged to separate filtrate and mycelium. The moist mycelium cake is stirred with 200 ml. of n-propanol, adjusted to a pH of 2.0 to 3.0 with sulfuric acid and left in a cold room overnight. The propanol is separated by centrifuging, and the mycelial cake is extracted three more times with 100-ml. portions of n-propanol. The combined propanol extracts are concentrated in vacuo to a small volume of about 130 ml., at which point a precipitate forms. This precipitate is centrifuged down and dried in a vacuum. About 1.114 gm. are recovered with a potency of about 1176 *Candida albicans* d.u./mg. 820 mg. of this solid is finely ground and dissolved by warming in a mixture of 80 ml. of n-butanol and 16 ml. of methanol while 80 ml. of water is gradually added. To this solution 48 ml. of hexane is added and the mixture stirred and allowed to stand at room temperature overnight. A crop of pale yellow crystals of amphotericin is formed, which is filtered and dried in a desiccator. Further crops of less pure material may be obtained by concentrating the mother liquors in vacuo.

Example 6

EXTRACTION FROM BASIC WHOLE BROTH

To a 500-ml. sample of amphotericin-containing whole broth assaying 11,000 d.u./ml. *Saccharomyces cerevisiae* is added an equal volume of isopropyl alcohol. The pH of this mixture is then raised to 10.5 using 20% sodium hydroxide. This mixture is then stirred for one-half hour, 2% Hyflo (w./v.) is then added, and it is filtered. The pH of the filtrate is lowered to 7, using 20% sulfuric acid, and the isopropyl alcohol removed under vacuum at a temperature no greater than 35° C. After standing overnight, the precipitate is filtered off, washed with water, then with acetone, and dried in vacuum. The yield amounts to about 1.22 g. (77%) of a mixture of amphotericin A and amphotericin B, which assays about 3400 d.u./mg. (*Saccharomyces cerevisiae*).

The amphotericin mixtures may be fractionated into their components, amphotericin A and amphotericin B, by the processes illustrated in the following examples:

Example 7

CRYSTALLIZATION USING ALCOHOL

The amphotericin obtained in Example 6 is placed in a 70% isopropyl alcohol 30% water slurry at a concentration of 32,000–35,000 u./ml. *Candida albicans*, with stirring; and the pH is lowered to 2 with hydrochloric acid. The insoluble material (crude amphotericin B) is filtered off and the pH of the filtrate raised to about 7.5. After standing overnight, the crystalline precipitate, consisting primarily of purified amphotericin A, is filtered off, washed with acetone and dried under vacuum. The yield of amphotericin A is about 50%, on a bioactivity basis.

Example 8

CRYSTALLIZATION USING DIMETHYL FORMAMIDE

The amphotericin obtained in Example 6 is slurried in dimethyl formamide (1 g./20 ml.). With stirring, the pH is lowered to 7, using concentrated hydrochloric acid. After stirring for one-half hour, Hyflo (1% w./v.) is added and the mixture filtered. To the filtrate is added one volume of methanol followed by the slow addition of one volume of water. (Although a methanol-water solution is preferred, ethanol, acetone or dioxane in water are also effective.) The mixture is then allowed to stand overnight at the resulting pH of 4.5. The precipitate thus formed is filtered off, washed with acetone and dried. It is composed of 85–90% amphotericin B, 5–10% amphotericin A and a minor amount of other impurities.

The pH of the resulting mother liquor from which amphotericin B has been isolated is then raised to 8 by addition of sodium hydroxide, and an additional 3 volumes of water is added. After standing overnight, the precipitate is filtered off, washed with acetone and dried. This precipitate is composed of 80–85% amphotericin A, 5–10% amphotericin B and a minor amount of other impurities.

The overall activity recovery amounts to 90–95%.

The fraction containing predominantly amphotericin A can be further purified by slurrying it in dimethylformamide at a concentration of 1 g. per 20 ml., stirring for one hour, filtering off the insolubles and adding the filtrate slowly to an equal volume of 50% aqueous methanol. The crystalline precipitate is filtered off after standing overnight, washed with acetone and dried. Substantially pure amphotericin A is obtained thereby in approximately 70–80% yield.

Fractionation and crystallization of the products obtained in Examples 1 through 5 also may be carried out by the methods of either Example 7 or 8, the latter being preferred, however, due to the higher yields of pure fraction obtained.

Salts and complexes of amphotericin A may be prepared according to the methods of the following examples:

Example 9

PREPARATION OF ALKALI METAL SALTS OF AMPHOTERICIN A

Amphotericin A readily forms salts, and the following process is equally effective in forming either the sodium or potassium salt:

Crystalline amphotericin A is suspended in an amount of methanol such that the concentration of the antibiotic is about 250,000 u./ml. (*Saccharomyces grevisiae*). Two equivalents of 1 N methanolic sodium hydroxide are added, and the mixture is stirred for 15 minutes to assure complete solution of the antibiotic. The solution is filtered and 10 volumes of acetone are added to the filtrate. A precipitate of the sodium salt is formed thereby which is filtered off, washed with acetone and dried in a desiccator. The yield of the sodium salt is about 90% of the original amphotericin A based on its biological activity (in vitro).

The sodium salt has a much greater solubility in water (50–60 mg./ml.) than the original crystalline amphotericin A. It also has good solubility in methanol and dimethyl formamide. It is somewhat soluble in ethanol and isopropanol but insoluble in ether, acetone, butanol, chloroform, benzene, hexane and dioxane.

Example 10

PREPARATION OF THE CALCIUM CHLORIDE COMPLEX

A calcium chloride complex of amphotericin A can be prepared by dissolving amphotericin A in 1% methanolic calcium chloride (1 gm./20 ml.), filtering off any insoluble material and adding 5 volumes of acetone to the filtrate. The precipitate is filtered off, washed with acetone and dried under vacuum. The solubility of the calcium chloride complex in organic solvents is similar to that of the acid salts. In water, however, the complex hydrolyzes and its solubility is that of the original amphotericin A.

Example 11

PREPARATION OF AN ACID SALT

Crystalline amphotericin A is dissolved in dimethyl formamide (1 g./25 ml.), and an equivalent of concentrated hydrochloric acid is added thereto. The mixture is filtered and ten volumes of acetone are added to the neutral filtrate. The precipitate formed thereby is filtered off, washed with acetone and dried in a vacuum desiccator. The product, which is obtained in about a 90% yield, contains on equivalent of acid and has an in vitro bioactivity equivalent to that of the crystalline amphotericin A. It is somewhat more soluble in water and much more soluble in methanol, etehanol, isopropanol and butanol than is the crystalline amphotericin A. The acid salt, however, is insoluble in acetone, chloroform, ether, benzene, ethyl acetate and hexane.

The sulfate has been prepared in the same manner by substituting an equivalent of sulfuric acid for the hydrochloric acid. It has properties similar to the hydrochloride.

CHEMICAL AND PHYSICAL PROPERTIES OF AMPHOTERICIN A

Crystalline Amphotericin A has the following physical and chemical characteristics:

Melting point: Darkens at 180–185° C., browns and shrinks at 198–200° C., melts with decomposition at about 210° C.

Elementary analysis:

C=59.28%
    H=8.43%
    N=1.81%
    O=30.48% (by difference)
    No other elements present
    No methoxy or acetyl groups Specific optical rotation: $[\alpha]_D^{24\,°\,C.}$ +163° (pyridine); +93° (acetic acid); +136° (dimethylformamide); +28° (0.1 N HCl in methanol).

Solubility: Good solubility in glacial acetic acid and dimethyl formamide. Soluble to the extent of about 1 mg./ml. in methanol, aqueous isopropyl alcohol and wet butanol, much more soluble in these solvents when acidified or highly alkalinized. (For example, in a 50% isopropyl alcohol solution, the solubility of amphotericin A is, as stated, approximately 1 mg./ml. at pH's between 3 and 8; at pH's of 2, 9 and 10, however, the solubility is 3 mg./ml. whereas at pH 11, the solubility has increased to 8–10 mg./ml.)

The antibiotic is insoluble in water at neutral or acid pH's under ordinary conditions but is soluble at pH 10 and above. In dilute solutions, however, the antibiotic may be dissolved in a neutral aqueous solution by raising the pH of a suspension of the material to 11 as, for example, with sodium hydroxide. The solution thus formed may then be neutralized with an acid without any precipitation occurring.

Amphotericin A is insoluble in ether, dioxane, ethyl acetate, amyl acetate, chloroform, benzene, acetone, hexane, absolute ethanol, isopropanol or butanol.

Ultraviolet spectrum: The ultraviolet absorption maxima of crystalline amphotericin A in methanol are:

| λ max. (mμ) | $E_{1\,cm.}^{1\%}$ |
| --- | --- |
| 228 | 280 |
| 280 | 262 |
| 291 | 520 |
| 304 | 780 |
| 318 | 715 |
| 343 | 24 |
| 362 | 34 |
| 381 | 55 |
| 405 | 66 |

Some of the adsorption in the 362–405 region may be due to the presence of some amphotericin B.

Infrared spectrum: The infrared absorption spectrum of amphotericin A suspended in Nujol mull is reproduced in the drawing. Amphotericin A shows peaks (and shoulders indicated as "sh") at the following frequencies and wave lengths:

| Frequency (cm.$^{-1}$) | Wavelength (μ) | Frequency (cm.$^{-1}$) | Wavelength (μ) |
| --- | --- | --- | --- |
| 3,333 | 3.00 | 1,129 | 8.86 |
| 1,695 | 5.90 | 1,105 | 9.05 |
| 1,656 | 6.04 | 1,066 | 9.38 |
| 1,623 | 6.16 sh | 1,035 | 9.66 |
| 1,567 | 6.38 sh | 1,008 | 9.92 |
| 1,546 | 6.47 | 992 | 10.08 |
| 1,425 | 7.02 sh | 977 | 10.24 sh |
| 1,403 | 7.13 | 949 | 10.54 |
| 1,374 | 7.28 sh | 912 | 10.96 |
| 1,323 | 7.56 | 893 | 11.20 |
| 1,276 | 7.84 sh | 877 | 11.40 |
| 1,232 | 8.12 | 850 | 11.76 |
| 1,201 | 8.32 sh | 836 | 11.96 |
| 1,183 | 8.45 | 810 | 12.34 |
| 1,159 | 8.63 | 794 | 12.60 |
|  |  | 760 | 13.16 |

Neutral equivalent of crystalline amphotericin A:

929 titrated as a base
989 titrated as an acid pH stability: Stable at all pH's between 3 and 11 for at least as long as 24 hours. At a pH as low as 2, amphotericin A is stable for as long as 3 hours with only a small amount of decomposition taking place.

Thermal stability: Stable up to about 70° C. in a neutral solution of 50% isopropanol.

Chemical tests: Yields a yellow color with ferric chloride.

BIOLOGICAL PROPERTIES OF THE AMPHOTERICIN A

Amphotericin A possesses a wide antifungal spectrum, as shown by the following tabulation:

| | Amphotericin A, MIC in λ/ml. |
| --- | --- |
| Saccharomyces cerevisiae | 3.1 |
| Aspergillus fumigatus | 3.1 |
| Aspergillus niger | 3.1 |
| Penicllium notatum | 3.1 |
| Ceratostomella ulmi | 1.6 |
| Candida albicans | 1.6 |
| Trichophyton mentagrophytes 9533 | 1.6 |
| Microsporum audouini | 3.1 |
| Microsporum canis | 3.1 |
| Botrytis tulipae | 6.3 |
| Rhodotorula glutinis | 3.1 |
| Fusarium bulbigenium | 6.3 |

Amphotericin A is of use as a preservative (for example, in leather, paper and paints) and especially in plastics and fabrics to render them proof against mildew or other fungus attack. In the protection of fabrics, for example, the fabric may be impregnated with amphotericin A or a salt thereof as by soaking or spraying. Amphotericin A can also be used as a plant protective agent, for which purpose it can be sprayed on the plants to be treated. A suitable spray can be prepared by wet ball-milling amphotericin A or a salt thereof with water and preferably a wetting agent, such as a polyoxyalkylene sorbitan higher fatty acid (e.g., Tween 20, a polyoxyethylene sorbitan monolaurate). The antifungal effectiveness of amphotericin A in human beings has not as yet been demonstrated.

The invention may be otherwise variously embodied within the scope of the appended claims.

We claim:

1. A substance effective in inhibiting the growth of fungi, selected from the group consisting of amphotericin A and the salts thereof, said amphotericin A being an amphoteric substance having the following elementary analysis: C=59.28%, H=8.43%, N=1.81%, O=30.48%, that possesses a crystalline structure in the pure state; has a specific optical rotation, as measured by the D line of sodium at 24° C. of +163° in pyridine, +93° in acetic acid, +136° in dimethyl formamide and +28° in 0.1 N HCl in methanol; is soluble in glacial acetic acid and dimethyl formamide; has an ultraviolet absorption spectrum measured in methanolic HCl with bands at the following wave lengths: 228, 291, 304 and 318 millimicrons and respective extinction coefficients of 280, 520, 780 and 715; an infrared absorption spectrum when suspended in hydrocarbon oil in solid form as shown in the drawing; and a neutral equivalent when titrated as a base of about 929 and as an acid of about 989.

2. Amphotericin A as described in claim 1.

3. A hydrochloride salt of amphotericin A as described in claim 1.

4. An alkali metal salt of amphotericin A as described in claim 1.

5. A sodium salt of amphotericin A as described in claim 1.

6. A sulfate of amphotericin A as described in claim 1.

References Cited in the file of this patent

FOREIGN PATENTS 712,547    Great Britain _____ July 28, 1954

OTHER REFERENCES

Ball et al.: J. Gen'l. Microbiol., August 1957, pp. 96–102.

Waksman et al.: "The Actinomycetes and Their Antibotics," 1953, pp. 91, 176, 177 and 197.

Vandeputte et al.: Antibiotics Annual, 1955–56, pp. 587–591, published 1956.

Vandeputte et al.: Abst. of Paper No. 81, 3d Ann. Antibiotic Symp., 1955, Wash., D.C. (1 page).